United States Patent
Mayinger et al.

(10) Patent No.: US 11,499,822 B2
(45) Date of Patent: Nov. 15, 2022

(54) CALIBRATION STANDARD FOR GEOMETRY CALIBRATION OF A MEASUREMENT SYSTEM OPERATING BY TACTILE AND/OR OPTICAL MEANS, METHOD FOR CALIBRATION, AND COORDINATE MEASURING MACHINE

(71) Applicant: Carl Zeiss Industrielle Messtechnik GmbH, Oberkochen (DE)

(72) Inventors: Philipp Mayinger, Aalen (DE); Tobias Held, Noerdlingen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 48 days.

(21) Appl. No.: 17/214,586

(22) Filed: Mar. 26, 2021

(65) Prior Publication Data
US 2021/0302156 A1 Sep. 30, 2021

(30) Foreign Application Priority Data
Mar. 26, 2020 (DE) ...................... 10 2020 108 407.2

(51) Int. Cl.
*G01B 5/008* (2006.01)
*G01B 21/04* (2006.01)

(52) U.S. Cl.
CPC .................. *G01B 21/042* (2013.01)

(58) Field of Classification Search
CPC .................................................. G01B 21/042
(Continued)

(56) References Cited

U.S. PATENT DOCUMENTS 7,755,754 B2 * 7/2010 Spalding .............. G01B 21/042
356/243.1
8,539,814 B2 9/2013 Kakemizu et al.
(Continued)

FOREIGN PATENT DOCUMENTS

DE 102016122509 A1 6/2017
DE 102017113897 A1 12/2018
(Continued)

OTHER PUBLICATIONS

Office Action issued in German Patent Application No. DE 10 2020 108 407.2, dated Jan. 14, 2021 (from which this application claims priority) and English language translation thereof.
(Continued)

*Primary Examiner* — George B Bennett
(74) *Attorney, Agent, or Firm* — Ewers IP Law PLLC; Falk Ewers (57) ABSTRACT

A calibration standard for geometry measurement calibration of a measurement system operating by tactile and/or optical means is provided which includes a flat surface having a structure that is capturable by a measurement system operating by optical and/or tactile means. The structure has a changeable periodicity that is capturable by a sensor in a first direction and/or in a second direction and for a change in the periodicity to code position information and/or direction information. In addition, a method for calibrating a coordinate measuring machine operating by tactile and/or optical means and to a coordinate measuring machine for such a method or having such a calibration standard is provided.

13 Claims, 5 Drawing Sheets

(58) Field of Classification Search
USPC .......................................... 33/502, 503, 556
See application file for complete search history.

(56) References Cited

U.S. PATENT DOCUMENTS

| | | | |
|---|---|---|---|
| 9,683,827 B2 * | 6/2017 | Wimmer | G01B 21/042 |
| 10,209,102 B2 | 2/2019 | Nagura | |
| 10,422,636 B2 * | 9/2019 | Nakagawa | G01B 5/012 |
| 10,507,560 B2 * | 12/2019 | Brenner | G01B 5/28 |
| 10,706,562 B2 * | 7/2020 | Haverkamp | G01B 5/008 |
| 2012/0105864 A1 | 5/2012 | Novak et al. | |
| 2018/0003491 A1 | 1/2018 | Sabelli et al. | |
| 2018/0372481 A1 * | 12/2018 | Stigwall | G01B 11/005 |
| 2019/0025793 A1 * | 1/2019 | Ould | G05B 19/401 |
| 2022/0074732 A1 * | 3/2022 | Shepherd | G01B 21/042 |

FOREIGN PATENT DOCUMENTS

| | | | |
|---|---|---|---|
| JP | S635204 A | 1/1988 | |
| JP | 2006064459 A | 3/2006 | |
| JP | 2011043340 A | 3/2011 | |
| JP | 2011158368 A | 8/2011 | |
| JP | 2013029405 A | 2/2013 | |
| JP | 2017166852 A | 9/2017 | |
| JP | 2018504593 A | 2/2018 | |

OTHER PUBLICATIONS

Office Action issued in Japanese Patent Application No. JP 2021-046205, dated Feb. 1, 2022 and English language translation thereof.

* cited by examiner

CALIBRATION STANDARD FOR GEOMETRY CALIBRATION OF A MEASUREMENT SYSTEM OPERATING BY TACTILE AND/OR OPTICAL MEANS, METHOD FOR CALIBRATION, AND COORDINATE MEASURING MACHINE

CROSS REFERENCE TO RELATED APPLICATIONS

This application claims priority to German patent application DE 10 2020 108 407.2, filed Mar. 26, 2020, the entire content of which is incorporated herein by reference.

TECHNICAL FIELD

The disclosure relates to a calibration standard for geometry measurement calibration of a measurement system operating by tactile and/or optical means, to a method for calibrating a coordinate measuring machine operating by tactile and/or optical means on such a calibration standard, and to a coordinate measuring system.

BACKGROUND

For measuring the geometric dimensions, the surface roughness and/or other characteristics of components and the surfaces thereof, what are known as stylus instruments are used. Said stylus instruments operate either using mechanical probing or use corresponding optical methods. In order to obtain reproducible measurement results using such a coordinate measuring machine, a calibration of the measurement system both as regards the position and also as regards the measurement direction is generally performed. For this purpose, a large number of probing contacts are typically made on a measurement calibration sphere. This procedure generally takes a few minutes.

In a stylus instrument, a probing element, such as a diamond needle, is generally mounted to a movably supported measurement arm. During the measurement, the probing element lies against the component surface with a specified contact force and is deflected by structures on the component surface. The deflection of the measurement arm, which is to take place perpendicularly to the component surface, is captured by a transducer that generates electrical measurement signals. Over the course of the measurement, the measurement arm with the probing element is guided parallel to the workpiece surface with the aid of an advance unit. In this way, a line-shaped profile of the component surface is obtained. Contactlessly operating devices for capturing the geometry of a component surface are also known. Said devices can be used in particular for measurement on very soft workpieces. Such optical probes can be configured, for example, as autofocus sensors or confocal white light sensors.

Larger measurement systems in which the surface sensor is mounted to a coordinate measuring machine usually include a table carrying the workpiece to be measured and a position device allowing the sensor to be displaced with high accuracy in three orthogonal displacement directions X, Y, and Z relative to the table. Furthermore, coordinate measuring machines having a displaceable table that moves relative to the stationary measurement apparatus are known. Coordinate measuring machines furthermore have an evaluation and control device, which controls the movements of the positioning device.

In modern production procedures, there is increasingly the aim to continuously monitor the components that are being used or produced with respect to the manufacturing tolerances. A roughness or geometry measurement calibration in that case no longer takes place in a laboratory or at specially equipped testing sites but may actually have to be integrated in the production sequence. The problem then arises that a calibration of the measurement system is required to achieve specific accuracies. For this purpose, a calibration for the absolute position of the probing element in space and for the measurement direction must be performed. Using the techniques that are available today, this is associated with a considerable time expenditure.

For example, a great number of adaptations must be performed typically on a measurement calibration sphere so as to ascertain the absolute position. A geometric sphere can be fitted to the measurement points in space thus ascertained, and in this way the absolute position of the probing element can be ascertained. This procedure involves special requirements in terms of the probe geometry to allow a measurement on such a sphere. It is also possible that the probing element, such as a diamond needle, sustains damage during the measurement process.

For calibrating a roughness sensor, what is known as a calibration standard, or standard, is used, which has a surface structure with a calibrated average roughness depth. If the aim is to ascertain the linearity of the overall measurement system, measurements must be performed on a plurality of roughness standards with a calibrated average roughness depth. This is a complex and expensive measurement sequence. If the aim is furthermore for example to ascertain the accuracy of the advance, evaluations of a special standard with calibrated average groove spacing are possible, which again requires a separate standard.

SUMMARY

It is an object of the disclosure to provide a calibration standard for geometry measurement calibration of a measurement system operating by tactile and/or optical means and a method for calibrating a coordinate measuring machine operating by tactile and/or optical means on a calibration standard, which avoids the aforementioned drawbacks and requires in particular a smaller number of measurements and/or a smaller number of calibration standards.

This object is achieved by a calibration standard for geometry measurement calibration of a measurement system and a method for calibrating a coordinate measuring machine as described herein.

The calibration standard according to an aspect of the disclosure for geometry measurement calibration of a measurement system operating by tactile and/or optical means has a flat surface having a structure that is capturable by a measurement system operating by optical and/or tactile means. The disclosure makes provision for the structure to have a changeable periodicity that is capturable by a sensor in a first direction and/or in a second direction and for a change in the periodicity to code position information and/or direction information. With such a calibration standard, a measurement system designed for probing such a calibration standard can capture the structure in the first and/or the second direction with a sensor, ascertain the periodicity, and in this way transcode it into position information and/or direction information. In this way, information relating to the absolute position of the structure and/or the direction in which the measurement was performed, captured by the sensor, can be acquired with a simple single measurement.

In the case of coding of the position, the above-described many instances of making probing contact on a measurement calibration sphere are thus dispensed with. For example, if the position is captured at the start and at the end of the measurement process, the accuracy of the advance can be ascertained during the measurement. The alignment of the sensor in the plane of the calibration standard can also be simply ascertained.

Specifically, for example the first direction and the second direction can be perpendicular to each other.

According to one exemplary embodiment, the structure in the first and/or the second direction is formed according to a sine function. A sine function has a strict periodicity, is mathematically easy to manage, and can be produced with good accuracy.

In this context, the frequency and/or the amplitude of the sine function according to one typical exemplary embodiment is/are modulated with a modulation function. In this case, the underlying sine function represents a carrier function whose properties, such as frequency and/or amplitude, are modulated in accordance with a modulation function. In the modulation function, the position information and/or direction information is then coded accordingly. So, if for example the frequency of the sine function is modulated, the measurement system can measure the sine function per se, determine the frequency thereof, and derive the instantaneous position from the height of the frequency. The same correspondingly applies to the amplitude of the sine function.

In a specific configuration, the modulation function is a linear function or a sine function, for example a sine function with a linearly changing amplitude. Specifically, the frequency and/or the amplitude of the sine function can thus increase/decrease linearly or be modulated for example with a sine function having a linearly changing amplitude and/or frequency. In both cases, the instantaneous position and/or direction can be acquired by way of mathematical further processing of the measurement signal.

A particularly typical exemplary embodiment is obtained if the frequency is modulated in the first direction for the sine function of the carrier function of the structure and the amplitude is modulated in the second direction for the sine function of the carrier function. The frequency of the carrier function is advantageously selected such that a plurality of full periods are capturable in the case of one measurement process. For example, in the case of a measurement process over a length of 5 mm in a diagonal direction, i.e., not parallel to the first or second direction, and in the case of a sinusoidal carrier function, corresponds to two waves, corresponding to 1.7 l/mm in the first and the second directions.

The carrier frequencies can differ in the first and the second directions. The relative rate of change of the modulation should be less than or equal to the relative rate of change of the carrier frequency so that the modulation can be separated meaningfully from the carrier signal.

In the case of a periodic modulation, at least one half-wave should be measured so that the underlying function can be determined.

The different types of modulation per se offer good differentiability between the modulation functions and thus allow easy evaluation of the measurement result.

If the position is coded in one direction with frequency modulation and the position is coded in the other direction with amplitude modulation, the following information can be extracted: From the frequency modulation, the modulation function and, based thereon, the start and the end position can be determined in the first direction via the start and the end value. From the amplitude modulation, the modulation function and, based thereon, the start and the end position can likewise be determined in the second direction via the start and the end value.

One advantageous development of the disclosure is obtained by virtue of the fact that the frequency of the periodicity lies at least partially above the frequency that typically occurs when measuring surfaces. This allows the ascertainment of the highest evaluable spatial frequencies of the measurement system in the case of a measurement in this region, without an additional calibration standard being necessary. The dynamic behavior can furthermore be investigated and checked. In addition, this can be used as a function test of the measurement system per se and for checking the state of the measurement needle.

The object is also achieved by a method for calibrating a coordinate measuring machine operating by tactile and/or optical means on a calibration standard as described above. The method includes the steps of performing a measurement on the structure of the calibration standard in one direction, evaluating the measurement for decoding the position information and/or the direction information.

One advantageous configuration of the method includes the step of comparing the position information and/or the direction information with position information and/or direction information of the coordinate measuring machine. This allows calibration of the coordinate measuring machine.

The object is furthermore achieved by a coordinate measuring system for performing the stated method and by a coordinate measuring system with a previously described calibration standard.

BRIEF DESCRIPTION OF THE DRAWINGS

The disclosure will now be described with reference to the drawings wherein.

DESCRIPTION OF EXEMPLARY EMBODIMENTS

Figure 1:
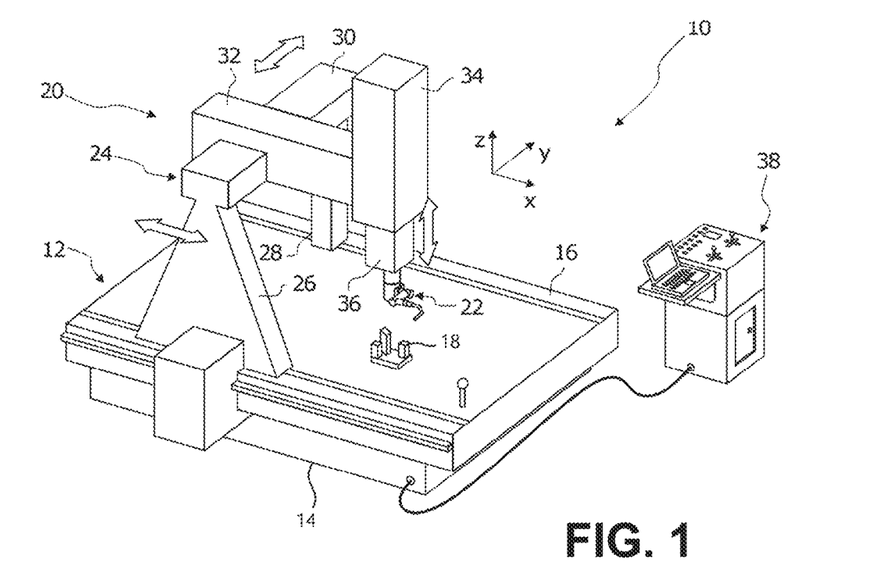
FIG. 1 shows a perspective view of a coordinate measuring machine.

FIG. 1 shows a coordinate measuring machine 10 in a perspective illustration. The coordinate measuring machine 10 includes a table 12 including a base 14 and a plate 16 made, for example, of hard rock. The plate 16 serves to receive a workpiece 18, the surface of which is intended to be measured. In the illustrated exemplary embodiment, the measurement is a spatially resolved roughness measurement.

The table 12 carries a positioning device 20, with which a measurement apparatus 22 can be positioned relative to the table 12 with high accuracy. In the exemplary embodiment illustrated, the positioning device 20 has a gantry-type configuration and includes a gantry 24, which is mounted with two feet 26, 28 at the peripheries of the table 12 and is displaceable along the table 12 in the horizontally extending X-direction in a motor-driven manner. A cantilever 32 is mounted on a gantry crossbeam 30, which interconnects the two feet 26, 28, in such a way that said cantilever can be displaced in a motor-driven manner along the longitudinal direction of the gantry crossbeam 30, i.e., in the likewise horizontally extending Y-direction, as is indicated by a double-headed arrow. A measurement carrier 36 is received in a vertically aligned receptacle 34 of the cantilever 32 and is displaceable in a motor-driven manner along the vertically extending Z-direction.

A control and evaluation device 38, which can exchange control and measurement data with the measurement apparatus 22, is provided at a distance from the table. Said exchange can be effected—as is illustrated in FIG. 1—via appropriate lines or via a radio interface.

The range that can be reached by the measurement carrier 36 as a result of displacement movements along the X-, Y-, and Z-axes is of the order of approximately 2 m$^3$ in the illustrated exemplary embodiment, and thus even significantly larger workpieces 18 can be measured than what is illustrated in FIG. 1. This is merely exemplary, however. Other measurement systems with a larger or smaller measurement volume can of course also be used in connection with the disclosure.

For each of the three displacement directions X, Y, and Z, the positioning device 20 has at least one transducer, which returns information relating to the travels covered to the evaluation and control device 38. The evaluation and control device 38 controls the movements of the positioning device 20 and evaluates the measurement values transferred from the measurement apparatus 22. The evaluation also includes the computational correction of the measurement values supplied by the measurement apparatus 22. As a result, it is possible to take account of static and dynamic influences of the positioning device 20, thermal deformations of the table 12, and also the bend of tactile probes caused by contact forces.

Figure 2:
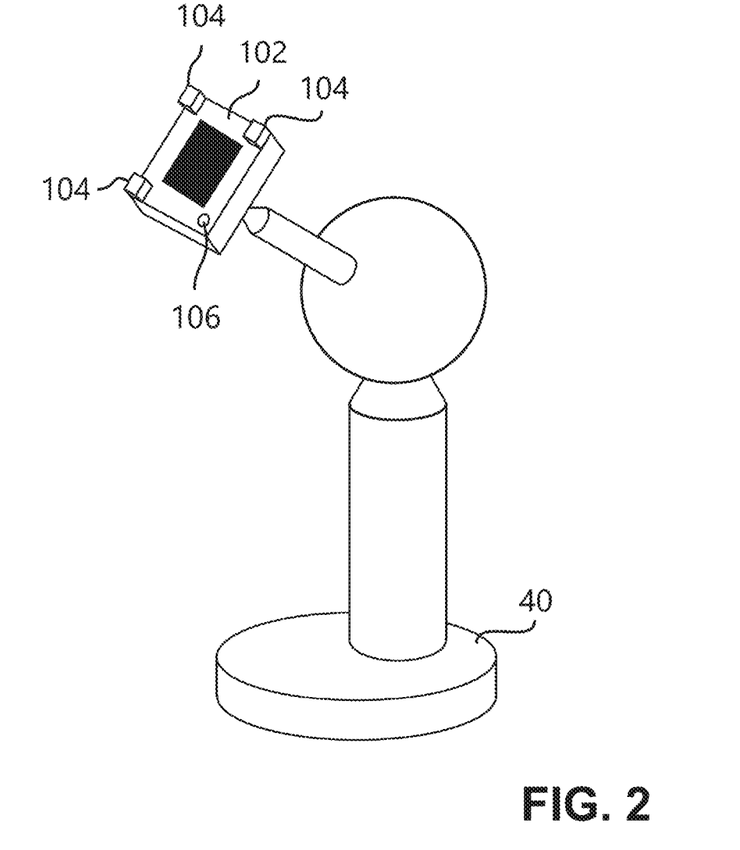
FIG. 2 shows a perspective view of a calibration standard that is mounted to a holder according to an exemplary embodiment of the disclosure.

FIG. 2 illustrates a calibration standard 100 placed on a holder 40. The calibration standard 100 has a structured surface 102, which can be used for calibration measurements. Additionally provided on the calibration standard 100 are measurement calibration aids 104 and a half shell 106 for self-centering probing contact.

The holder 40 can be mounted at different sites of the coordinate measuring machine 10, for example to the plate 16, to a retainer for a measurement calibration sphere, or to a probe interchanging magazine that may be present. The calibration standard 100 itself can be interchangeably mounted to the holder 40 with a magnetic retainer and be interchangeable.

Figure 3:
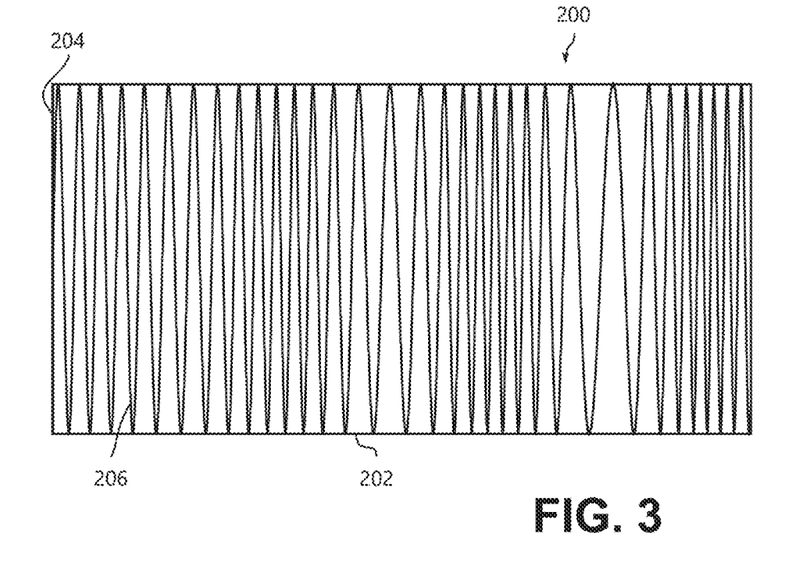
FIGS. 3 and 4 show schematic cross-sectional views of a surface structuring of the calibration standard in different directions.

FIG. 3 shows in a schematic illustration in a diagram 200 the function with which the surface 102 of the calibration standard 100 is structured in a first direction, specifically in the Y-direction. The illustration thus also depicts as it were a cross section of the structured surface 102 of the calibration standard 100 along the plane defined by the directions Y and Z. The abscissa 202 of the diagram 200 represents a length, for example 1 mm overall, along the Y-direction. The ordinate shows the height of the structure in the Z-direction, overall 2 μm, for example. The exemplary embodiment illustrated is a sine function with a specific base frequency. This base frequency of the sine wave is frequency-modulated with a frequency that clearly differs from the base frequency. The modulation function in the present case is again a sine function with a linearly changing amplitude. In the function 206 shown in FIG. 3, the amplitude increases from the left to the right. The result is the following function term:

The following holds true:

$$\sin(a \cdot x + b \cdot x \cdot \sin(c \cdot x)),$$

wherein a≫b.

In the case of a measurement with the coordinate measuring machine 10 on the calibration standard 100 in the Y-direction, the modulation function gives the spatial frequency of the calibration standard 100 with respect to the respective measured Y-position. A regional Fourier analysis of the measurement profile can be calculated for an evaluation for ascertaining the Y-position.

In principle, a calibration standard 100 having a surface 102 that is shown only in the Y-direction in FIG. 3 would already be advantageous. It would be possible to ascertain in the Y-direction absolute spatial coordinates in the Y-direction and to thus ascertain for example an advance accuracy.

Figure 4:
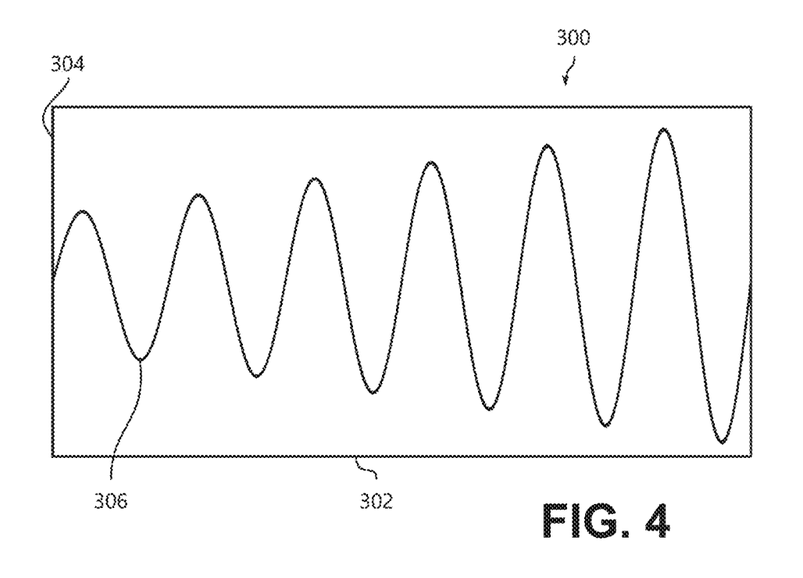

The surface structure 102 of the exemplary embodiment shown in FIG. 2 is at the same time likewise modulated in the X-direction and thereby codes the respective X-position. A sine wave with a specific frequency is likewise provided as a base function in the X-direction. In contrast to the Y-direction, the steady component, that is to say the carrier function, is amplitude-modulated. The modulation function for the amplitude is likewise a sine function with a linearly changing amplitude. The resulting function is illustrated—analogously to FIG. 3—in the diagram 300 shown in FIG. 4. The abscissa 302 of the diagram 300 again represents the length along the X-direction, and the ordinate 304 represents the height of the structure in the Z-direction with overall lengths or heights similar to the diagram 200. One exemplary function 306 is:

$$m \cdot x \cdot \sin(n \cdot x)$$

It is advantageous in the case of the simultaneous modulation in the Y- and X-directions if the modulation frequency of the amplitude modulation is clearly higher, as shown in FIG. 4, than that of the frequency-modulated surface signal in order to thus ensure good separation between the X- and Y-position data. In the actual measurement, the amplitude height in the X-direction represents the position within the structure with respect to the X-direction.

Figure 5:
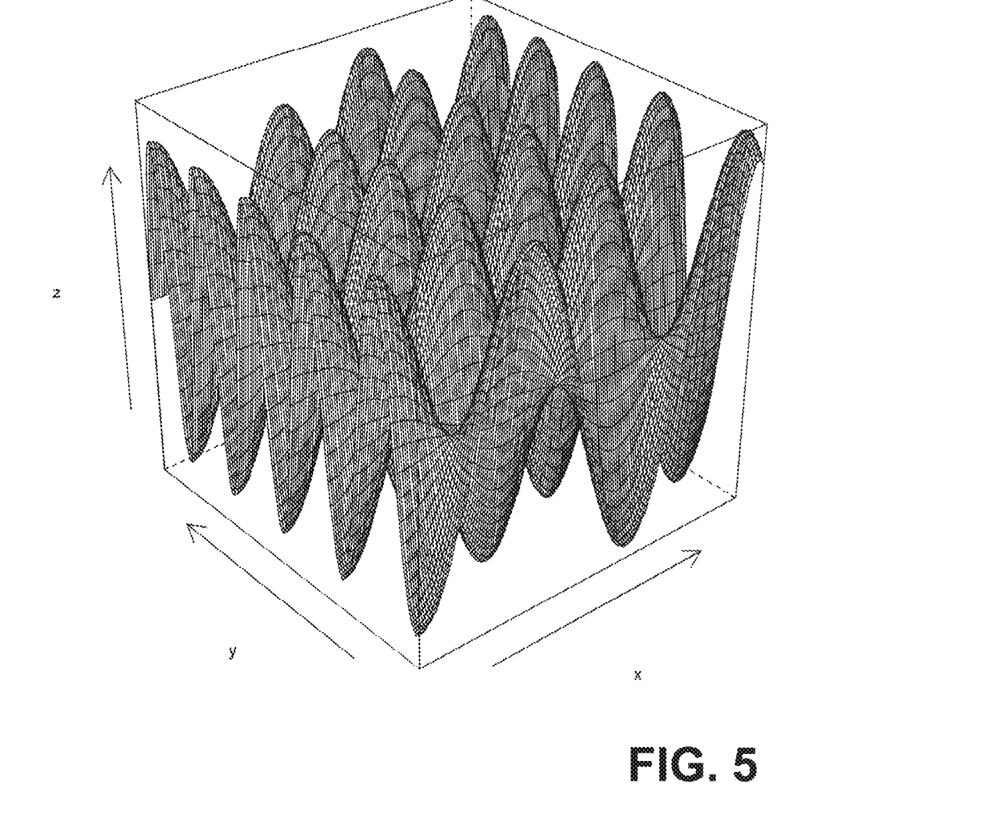
FIG. 5 shows a schematic perspective view of the surface structure of the calibration standard according to an exemplary embodiment of the disclosure.

FIG. 5 depicts the combined surface structure in a schematic illustration. It shows how the base frequency in the Y-direction is clearly higher than in the Y-direction. At the same time, the frequency of the modulation function is clearly higher in the X-direction than that of the frequency modulation in the Y-direction. However, this is not easily evident from FIG. 5.

The division of amplitude modulation and frequency modulation in the X- and Y-direction in the present case is random and can also be the other way round. It is likewise possible for example for the amplitude modulation to be realized with a simple linear scaling of the amplitude.

In order to then perform a measurement on the calibration standard 100, the position of the calibration standard 100 can be determined in a first step by a measurement calibration with the coordinate measuring system 10, for example on the measurement calibration aids 104, 106. Next, a measurement with a surface measurement system on the calibration standard 100, in particular on the structure 102, can be performed. This measurement can be performed from a desired first point on the surface 102 to a desired second point on the surface 102. The resulting probed section thus includes in the normal case components in the X-direction and components in the Y-direction.

The resulting measurement signal can be subjected to a Fourier analysis. The latter initially provides statements about the Y-position that will have to be corrected later.

At the same time, the measurement signal can be analyzed with respect to the amplitude. For this purpose, for example the envelope of the measurement signal can be determined. The start and end amplitude of the envelope at the start and at the end of the measurement process represent the components in the X-direction of the start position and the end position. With the incorporation of the overall measurement length L of the probed section, it is possible with simple triangulation to determine the angle tilted by which with respect to the Y-direction the measurement process was performed. In this way, it is possible in a simple manner already from the analysis of the envelope to ascertain both the X-position and the Y-position for the start and end point of the measurement.

In addition or alternatively, the envelope of the Fourier transform can be considered. Its amplitudes at the beginning and at the end of the measurement—ascertained for example from the envelope—allow the determination of the start position and the end position in the Y-direction. This can likewise be corrected with the correction factor obtained from the angle enclosed by the measurement section with the Y-direction.

It is possible to ascertain, using the above-described measurement method, the following properties via the measurement system:

| # | Parameter of the measurement of the geometry measurement calibration standard | Information about the measurement system | Limiting property of the geometry measurement calibration standard |
|---|---|---|---|
| 1 | Start point | Absolute position XYZ | Tolerance position standard to measurement calibration aid |
| 2 | Scanning direction | Alignment of the sensor in plane of the standard | Resolution orthogonal to the main direction |
| 3 | Scanning length | Accuracy advance | Resolution in main direction |
| 4 | Inclination of the scan | Alignment of the sensor orthogonal to the plane of the standard | Planarity of the standard |
| 5 | Height of the profile | Linearity of the measurement system | Low deviation of the target profile, high reproducibility |
| 6 | Standard deviation of the profile | Adjustment of the measurement system | s.a. |
| 7 | Frequencies of the profile | Dynamic behavior, MTF | High spatial frequencies up to 25 μm wavelength |

Reference data about periodicity and amplitude can be assigned to the standard from nominal data or a prior calibration measurement. For this purpose, a data carrier can also be supplied. The standard can allow machine-readable identification (RFID, barcode, etc.) for assignment purposes.

The deviation of the measurement data from the calibration measurement of said reference data can be used to calculate the information according to the above table.

The information obtained can be stored for the purpose of later correction as CAA table, FFT transformed, as spline or family of polynomials. For example, it is possible to describe the swing with linearization correction parameters.

Measurement errors that are not correctable—for example from a repetition measurement or from residues in the spline fitting—can additionally be assigned to the corresponding states (speed of signal change, swing, inclination of the scan, etc.) and be correspondingly stored.

The correction data and the residual error information can be stored on a data carrier, in a database, or in the sensor and be loaded into the controller or correction computation unit during the measurement. The correction data are used for correcting the measurement signal during the measurement. It is possible to continuously determine from the residual errors a state-dependent contribution to the measurement uncertainty and to transmit it to the evaluation software.

Figure 6:
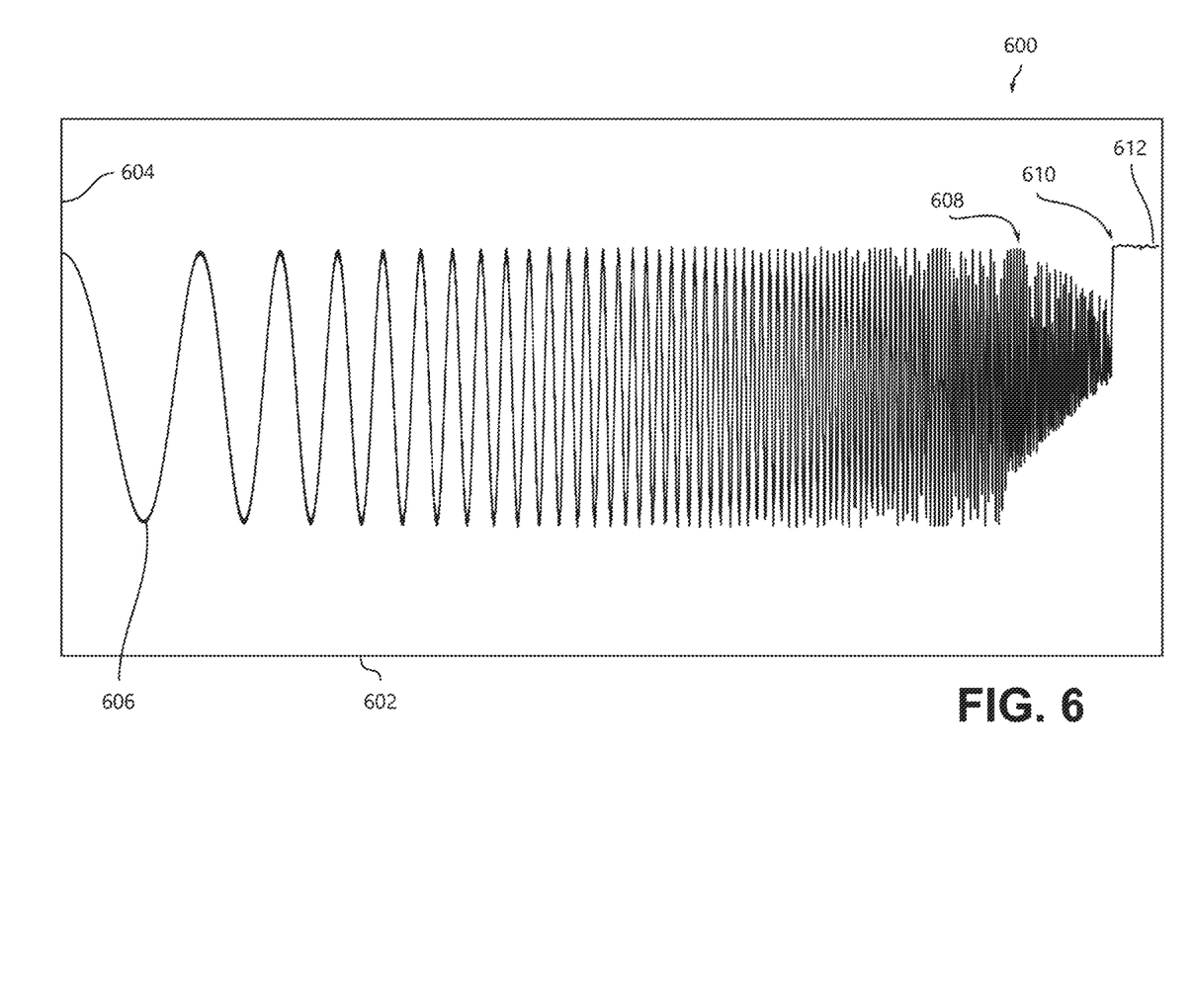
FIG. 6 shows a schematic illustration of a measurement signal for evaluating the highest possible spatial frequency.

In addition to the pure ascertainment of spatial and directional information, a plurality of geometric variables can be ascertained not only with a single measurement. If the highest spatial frequencies of the standard exceed the typical region of surfaces, a frequency transmission of the measurement system can be determined at the same time. This allows statements to be made about the performance and the installation conditions of the measurement system. Such an exemplary measurement is shown in FIG. 6. FIG. 6 shows a diagram 600, which illustrates on the abscissa 602 the position during a measurement. The entire measurement can extend for example over 3 mm. The ordinate 604 presents the measurement signal obtained, which corresponds to a profile depth. The entire profile depth measured can be, for example, 2 μm. As is shown in FIG. 6, the measurement signal 606 initially follows the profile depth of the calibration standard. In a specific region, which in FIG. 6 begins at the location 608, the measurement system can no longer completely follow the surface structuring. The measured amplitude of the measurement signal 606 decreases, even though this does not correspond to the actual structure. From a specific point, which occurs in the measurement signal 606 at the location 610, the frequency of the structured surface is so high that the measurement signal no longer perceives it and then only outputs a constant signal 612. In this way, the highest evaluable spatial frequency can be easily ascertained. The quality of the sensor advance for stylus systems can be determined with the aid of high-frequency grooves on the calibration standard. In this case, the advance can be moved counter to the movement of the machine, and the relative movement can be determined on the basis of the deflection of the stylus instrument.

The position of the structured surface 102 relative to the measurement calibration aids for the location determination can be determined with tactile or optical measuring instruments in order to calibrate the location for each individual.

The system can also be used for optically scanning sensors. The beam angle of the sensor can here be determined on the basis of a known measurement position on the standard of unknown coordinate measuring machine coordinates.

In principle, all possible functions that allow a separation of the X- and Y-information are permissible in the construction of the surface.

It is understood that the foregoing description is that of the exemplary embodiments of the disclosure and that various changes and modifications may be made thereto without departing from the spirit and scope of the disclosure as defined in the appended claims.

What is claimed is:

1. A calibration standard for geometry measurement calibration of a measurement system operating by tactile and/or optical means, the calibration standard comprising:
    a flat surface having a structure capturable by the measurement system operating by the tactile and/or optical means,
    wherein the structure has in at least one of a first direction and a second direction a periodicity that is capturable by a sensor and that changes, and
    wherein a change in the periodicity codes at least one of position information and direction information.

2. The calibration standard according to claim 1, wherein the first direction and the second direction are perpendicular to each other.

3. The calibration standard according to claim 1, wherein the structure is embodied in at least one of the first direction and the second direction in accordance with a sine function.

4. The calibration standard according to claim 3, wherein at least one of a frequency and an amplitude of the sine function are modulated with a modulation function.

5. The calibration standard according to claim 4, wherein the modulation function is a linear function or the sine function.

6. The calibration standard according to claim 5, wherein the modulation function is the sine function with a linearly changing amplitude.

7. The calibration standard according to claim 3, wherein for the sine function of the structure a frequency is modulated in the first direction and for the sine function an amplitude is modulated in the second direction.

8. The calibration standard according to claim 1, wherein a frequency of the periodicity lies at least partially above the frequency that typically occurs when measuring surfaces.

9. A method for calibrating a coordinate measuring machine operating by the tactile and/or optical means on a calibration standard according to claim 1, the method comprising:
    performing the measurement on the structure in one direction; and
    evaluating the measurement for decoding at least one of the position information and the direction information.

10. The method according to claim 9, wherein the calibration standard has a frequency-modulated sine structure in the first direction and an amplitude-modulated sine structure in the second direction, which is perpendicular to the first direction, and wherein the method further comprises determining an envelope of measured structure information.

11. The method according to claim 9, further comprising comparing at least one of the position information and the direction information with at least one of the position information and the direction information of the coordinate measuring machine.

12. A coordinate measuring system configured to carry out the method according to claim 9.

13. A coordinate measuring system comprising the calibration standard according to claim 1.

* * * * *